(12) United States Patent
Yoshikawa et al.

(10) Patent No.: US 9,139,077 B2
(45) Date of Patent: Sep. 22, 2015

(54) VEHICLE CONTROL SYSTEM AND CONTROLLER

(75) Inventors: Masato Yoshikawa, Susono (JP);
Nobufusa Kobayashi, Anjo (JP);
Yasuyuki Kato, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/354,029

(22) PCT Filed: Oct. 27, 2011

(86) PCT No.: PCT/JP2011/074848
§ 371 (c)(1),
(2), (4) Date: Apr. 24, 2014

(87) PCT Pub. No.: WO2013/061449
PCT Pub. Date: May 2, 2013

(65) Prior Publication Data
US 2014/0316625 A1    Oct. 23, 2014

(51) Int. Cl.
*G01M 17/00*  (2006.01)
*B60K 6/48*   (2007.10)
*B60W 10/02*  (2006.01)
*B60W 10/06*  (2006.01)
*B60W 20/00*  (2006.01)

(52) U.S. Cl.
CPC ............... *B60K 6/48* (2013.01); *B60W 10/02* (2013.01); *B60W 10/06* (2013.01); *B60W 20/00* (2013.01); *B60W 20/10* (2013.01); *B60L 2240/423* (2013.01); *B60L 2240/486* (2013.01); *B60Y 2300/429* (2013.01); *Y02T 10/6221* (2013.01)

(58) Field of Classification Search
USPC ................................................ 701/22, 29.1
See application file for complete search history.

(56) References Cited

U.S. PATENT DOCUMENTS

| 8,139,108 B2 * | 3/2012 | Stratton et al. ............... 348/114 |
| 8,326,475 B2 | 12/2012 | Yoshida et al. |
| 2008/0180523 A1 * | 7/2008 | Stratton et al. ............... 348/114 |
| 2009/0177337 A1 * | 7/2009 | Yuet et al. ........................ 701/2 |

FOREIGN PATENT DOCUMENTS

| JP | 2000-103259 | 4/2000 |
| JP | 2009-208562 | 9/2009 |
| JP | 2010-235089 | 10/2010 |

* cited by examiner

*Primary Examiner* — Hussein A. Elchanti
(74) *Attorney, Agent, or Firm* — Finnegan, Henderson, Farabow, Garrett & Dunner, LLP

(57) ABSTRACT

A vehicle control system includes a controller configured to be able to perform a slip control in which an internal combustion engine becomes a non-operation state by setting a first clutch to a release state and an electric rotating machine is driven by setting a second clutch to a slip state. In a case where a vehicle starts to run by starting up the internal combustion engine during the slip control is performed, the controller performs a first engagement control in which the second clutch becomes an engagement state and then the first clutch becomes an engagement state at the time a lock-up clutch is in a non-engagement state, and performs a second engagement control in which the first clutch becomes an engagement state and then the second clutch becomes an engagement state at the time the lock-up clutch is in an engagement state.

8 Claims, 4 Drawing Sheets

VEHICLE CONTROL SYSTEM AND CONTROLLER

CROSS-REFERENCE TO RELATED APPLICATIONS

This application is a national phase application of International Application No. PCT/JP2011/074848, filed Oct. 27, 2011, the content of which is incorporated herein by reference.

FIELD

The present invention relates to a vehicle control system and a controller.

BACKGROUND

As a conventional system mounted on a vehicle and controlling the vehicle, for example, Patent Literature 1 discloses a hybrid driving device that includes an electric rotating machine, a fluid transmission device, a transmission device, and an engine starting controller. The electric rotating machine is connected to an engine as an internal combustion engine through a transmission clutch. The fluid transmission device provides a lock-up clutch and includes a turbine runner and a pump impeller. The transmission device is connected to the electric rotating machine through the fluid transmission device, receives a driving force generated from one or both the engine and the electric rotating machine as driving force sources, and outputs the driving force input thereto while shifting gears the input driving force. The engine starting controller starts up the engine by controlling the lock-up clutch, the electric rotating machine, the transmission clutch, and the like from the non-starting state of the engine in which the engine is stopped and the lock-up clutch engages so that the driving force is transmitted from the electric rotating machine to the transmission device.

CITATION LIST

Patent Literature

Patent Literature 1: Japanese Patent Application Laid-open No. 2010-235089

SUMMARY

Technical Problem

Incidentally, in the hybrid driving device disclosed in Patent Literature 1, the engine starting controller performs a rotation number control in which the rotation number of the electric rotating machine becomes the target rotation number by the slip of the lock-up clutch and starts up the engine by the engagement of the transmission clutch. However, there is still room for improvement, for example, in the responsiveness or the fuel economy performance when the vehicle starts to run by starting up the engine.

The present invention is made in view of the above-described circumstances, and an object thereof is to provide a vehicle control system and a controller capable of appropriately starting a vehicle to run by starting up an internal combustion engine.

Solution to Problem

In order to achieve the above mentioned object, a vehicle control system according to the present invention includes an internal combustion engine and an electric rotating machine configured to be running driving sources of a vehicle; a first clutch configured to be able to connect the internal combustion engine and the electric rotating machine; a fluid transmission device connected to the electric rotating machine configured to output power from the internal combustion engine or the electric rotating machine through a lock-up clutch at the time the lock-up clutch is in an engagement state, and output the power from the internal combustion engine or the electric rotating machine through a working fluid at the time the lock-up clutch is in a non-engagement state; a transmission configured to include a second clutch capable of connecting the fluid transmission device to a driving wheel of the vehicle, and transmit the power from the fluid transmission device to output to the driving wheel side; and a controller configured to control the internal combustion engine, the first clutch, the electric rotating machine, and the second clutch so that a slip control can be performed in a manner such that the internal combustion engine becomes a non-operation state by setting the first clutch to a release state and the electric rotating machine is driven by setting the second clutch to a slip state, wherein in a case where the vehicle starts to run by starting up the internal combustion engine during the slip control is performed, the controller performs a first engagement control in which the second clutch becomes an engagement state and then the first clutch becomes an engagement state at the time the lock-up clutch is in a non-engagement state and performs a second engagement control in which the first clutch becomes an engagement state and then the second clutch becomes an engagement state at the time the lock-up clutch is an engagement state.

Further, in the vehicle control system, it is possible to configure that the controller controls the lock-up clutch in response to the state of the vehicle so as to switch the engagement state and the non-engagement state and switch the first engagement control and the second engagement control.

Further, in the vehicle control system, it is possible to configure that the controller performs the first engagement control by setting the lock-up clutch to the non-engagement state in a case where responsiveness is important at the time the vehicle starts to run, and performs the second engagement control by setting the lock-up clutch to the engagement state in a case where fuel economy performance is important at the time the vehicle starts to run.

Further, in the vehicle control system, it is possible to configure that in response to a state were the vehicle tows the other vehicle, a state of a selection portion for fixing the vehicle in an overdrive state, a state of a road surface where the vehicle runs, an inclination of the road surface where the vehicle runs, an acceleration request operation amount with respect to the vehicle, or a charging state of an electrical storage device mounted on the vehicle, the controller controls the lock-up clutch so as to switch the engagement state and the non-engagement state and switch the first engagement control and the second engagement control.

In order to achieve the above mentioned object, a controller according to the present invention that controls a driving device disposed in a power transmission path with respect to a driving wheel of a vehicle in order of an internal combustion engine as a running driving source, a first clutch, an electric rotating machine as a running driving source, a fluid transmission device including a lock-up clutch, and a second clutch, wherein the controller can perform a slip control in a manner such that the internal combustion engine becomes a non-operation state by setting the first clutch to a release state and the electric rotating machine is driven by setting the second clutch to a slip state, and in a case where the vehicle starts to run by starting up the internal combustion engine during the slip control is performed, the controller performs a first engagement control in which the second clutch becomes an engagement state and then the first clutch becomes an engagement state at the time the lock-up clutch is in a non-engagement state, and performs a second engagement control in which the first clutch becomes an engagement state and then the second clutch becomes an engagement state at the time the lock-up clutch is an engagement state.

Advantageous Effects of Invention

There is an effect that the vehicle control system and the controller according to the present invention can appropriately start the vehicle to run by starting up the internal combustion engine.

DESCRIPTION OF EMBODIMENTS

Hereinafter, an embodiment of the present invention will be described in detail with reference to the drawings. Furthermore, the present invention is not limited to the embodiment. Further, the components of the embodiment below include a component that can be easily replaced by the person skilled in the art or a component that substantially has the same configuration.

Embodiment

Figure 1:
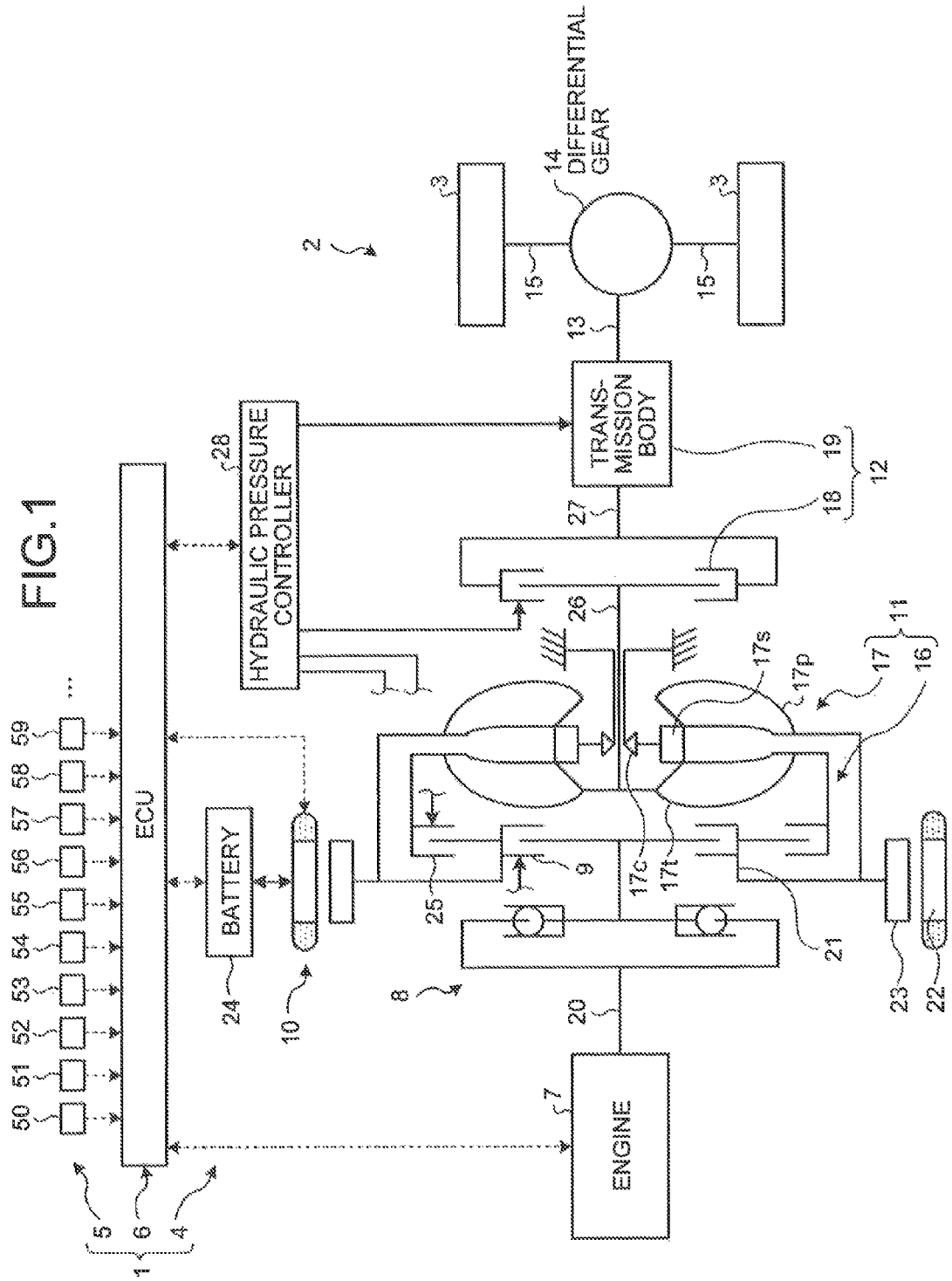
FIG. 1 is a schematic configuration diagram illustrating a vehicle control system according to an embodiment.
Figure 2:
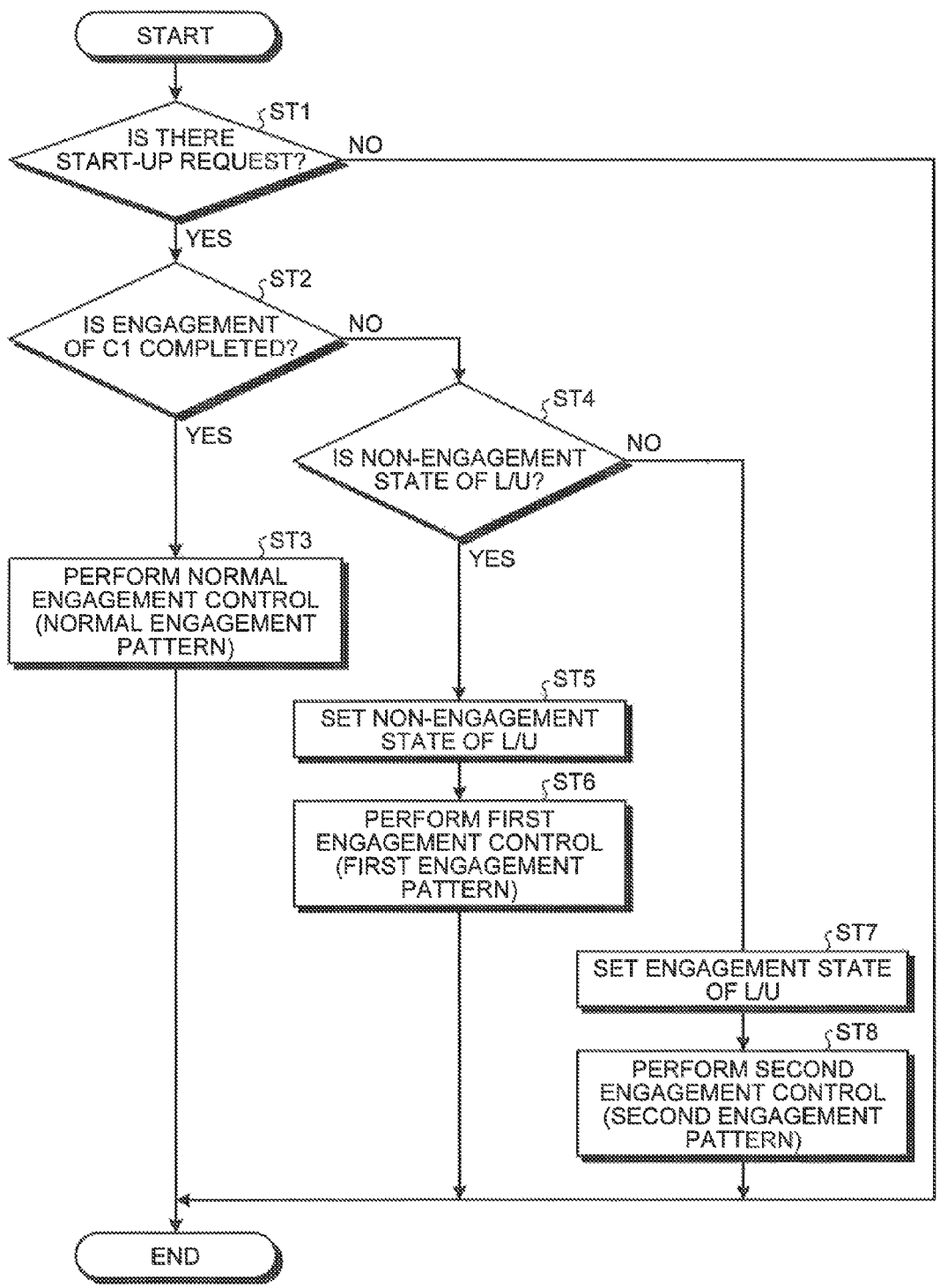
FIG. 2 is a flowchart illustrating an example of a control using an ECU of the vehicle control system according to the embodiment.
Figure 3:
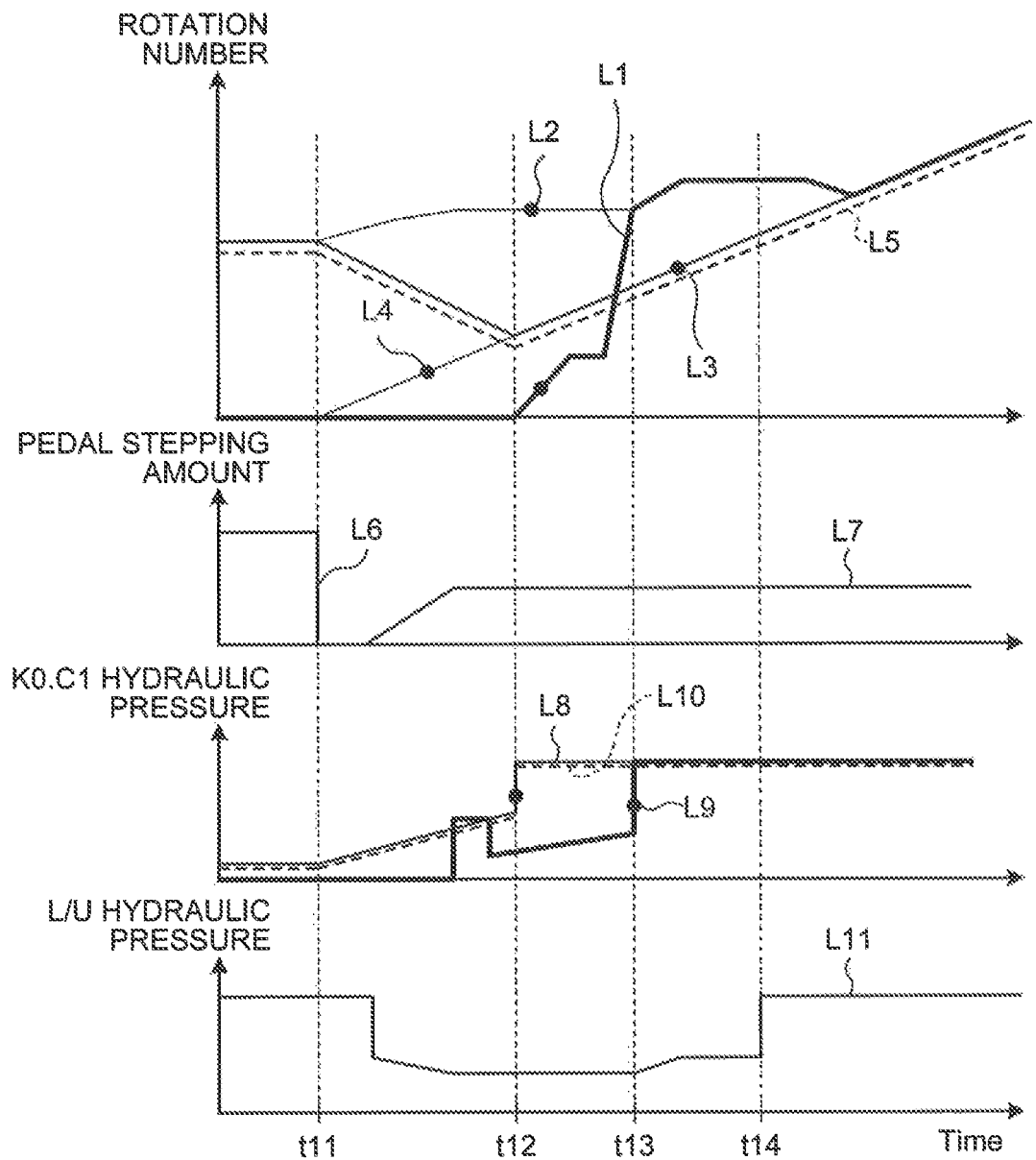
FIG. 3 is a time chart illustrating an example of an operation of the vehicle control system according to the embodiment.
Figure 4:
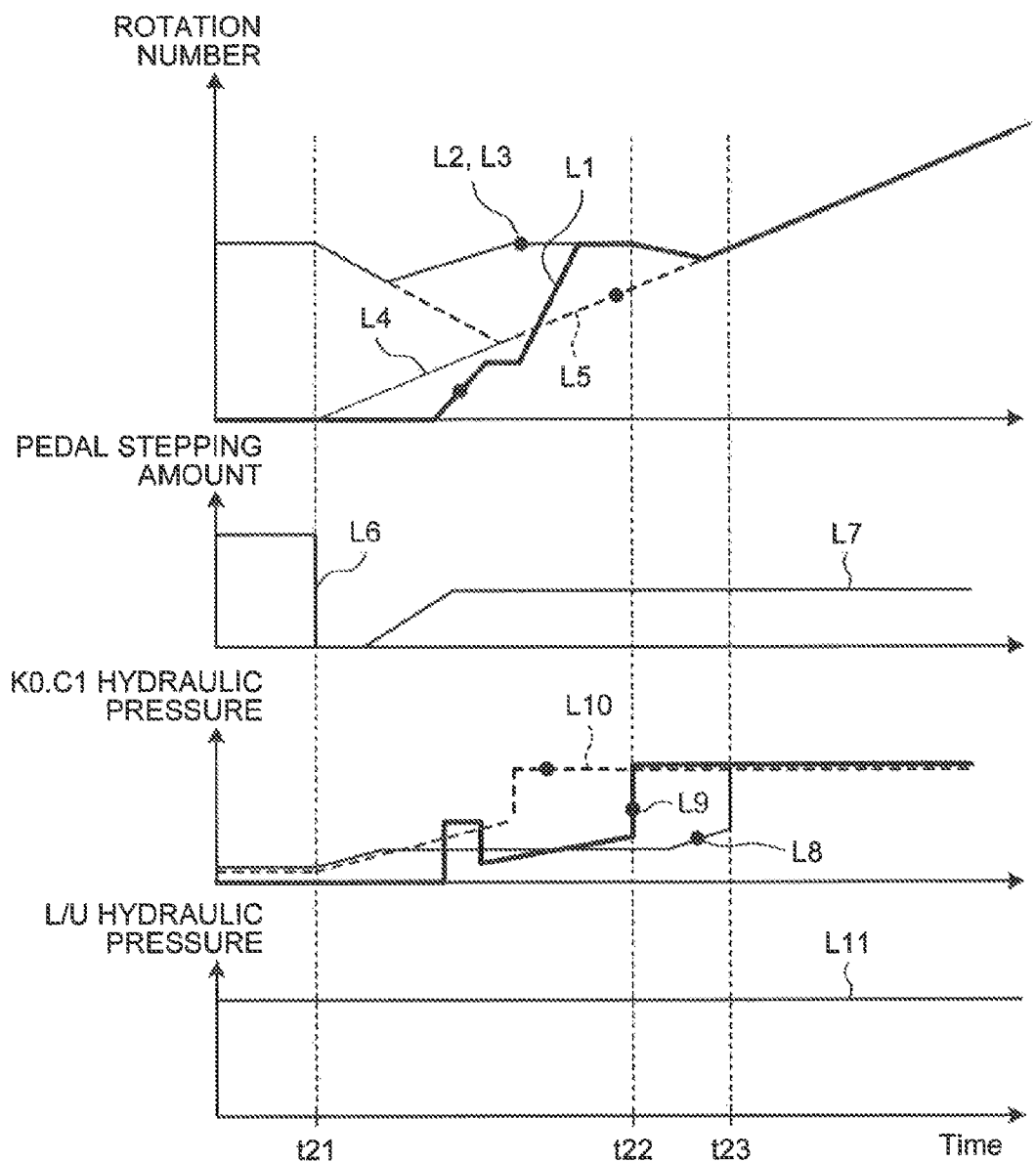
FIG. 4 is a time chart illustrating an example of an operation of the vehicle control system according to the embodiment.

FIG. 1 is a schematic configuration diagram illustrating a vehicle control system according to the embodiment, FIG. 2 is a flowchart illustrating an example of a control using an ECU of the vehicle control system according to the embodiment, and FIGS. 3 and 4 are time charts illustrating an example of an operation of the vehicle control system according to the embodiment.

This embodiment is a so-called 1MG+AT parallel hybrid type vehicle control system that includes one motor generator and an automatic transmission which is typically a stepped automatic transmission. This embodiment is applied to the vehicle, and typically includes the following components.

(1) A clutch that is engageable with and disengageable from an engine.

(2) A torque converter that is equipped with a lock-up mechanism.

(3) An N-control execution device that stops the engine and rotates a motor generator by causing the slip of the clutch inside a transmission during the stop of the vehicle.

Then, in this embodiment, the engagement pattern of the clutch is appropriately changed depending on the situation, for example, when the vehicle starts to run from the engine stop state by these components. Accordingly, this embodiment is made for the balance of the fuel economy performance and the vehicle starting responsiveness which are not compatible with each other.

Specifically, as illustrated in FIG. 1, a vehicle control system 1 of this embodiment is a system that is mounted on a vehicle 2 and controls the vehicle 2. Typically, the vehicle control system is an engine starting control system that controls the starting from the engine stop state of the vehicle 2. The vehicle 2 is a so-called "hybrid vehicle" that is equipped with an engine 7 that corresponds to an internal combustion engine as a running driving source (prime mover) causing the vehicle 2 to run and a motor generator 10 that corresponds to an electric rotating machine. More specifically, the vehicle 2 is the 1MG+AT "parallel hybrid vehicle" as described above.

The vehicle control system 1 includes a driving device 4 that drives a driving wheel 3 of the vehicle 2, a state detecting device 5 that detects the state of the vehicle 2, and an ECU 6 that corresponds to a controller for controlling the components of the vehicle 2 including the driving device 4.

The driving device 4 forms a parallel hybrid type power train in the vehicle 2, and includes one engine 7 and one motor generator 10, thereby rotationally driving the driving wheel 3 by these components.

The driving device 4 includes the engine 7, a damper mechanism 8, a K0 clutch 9 as a first clutch, and the motor generator 10. Further, the driving device 4 includes a torque converter 11 as a fluid transmission device, a transmission 12, a propeller shaft 13, a differential gear 14, and a drive shaft 15. Further, the torque converter 11 includes a lock-up mechanism 16 and a fluid transmission mechanism 17. The transmission 12 includes a C1 clutch 18 as a second clutch and a transmission body 19.

The components of the driving device 4 are disposed in the power transmission path with respect to the driving wheel 3 in order of the engine 7, the damper mechanism 8, the K0 clutch 9, the motor generator 10, the lock-up mechanism 16 and the fluid transmission mechanism 17 of the torque converter 11, the C1 clutch 18 and the transmission body 19 of the transmission 12, the propeller shaft 13, the differential gear 14, and the drive shaft 15 so that power can be transmitted therebetween. In this case, the driving device 4 is configured so that a crank shaft 20 as the output shaft of the engine 7 (the output shaft of the internal combustion engine) and a rotor shaft 21 as the output shaft of the motor generator 10 (the motor output shaft) are connected to each other through the damper mechanism 8 and the K0 clutch 9. Further, the driving device 4 is configured so that the rotor shaft 21 and the driving wheel 3 are connected to each other through the torque converter 11, the transmission 12, the propeller shaft 13, the differential gear 14, the drive shaft 15, and the like.

More specifically, the engine 7 is a heat engine that converts the energy of fuel into mechanical work by the combustion of the fuel in a combustion chamber and outputs the resultant as power. The engine 7 generates mechanical power (engine torque) in the crank shaft 20 with the combustion of the fuel, and outputs the mechanical power from the crank shaft 20. Further, the engine 7 can switch the operation state and the non-operation state thereof regardless of whether the vehicle 2 stops or runs.

Here, the operation state of the engine 7 (the state where the engine 7 is operated) indicates a state where the bower acting on the driving wheel 3 is generated and the thermal energy generated by the combustion of the fuel in the combustion chamber is output in the form of the mechanical energy such as torque. That is, in the operation state, the engine 7 burns the fuel in the combustion chamber so as to generate the power acting on the driving wheel 3 of the vehicle 2. Meanwhile, the non-operation state of the engine 7, that is, the state where the operation of the engine 7 is stopped indicates a state where the generation of the power is stopped and the supply of the fuel to the combustion chamber is cut (fuel-cut) so that the fuel is not burned in the combustion chamber and the mechanical energy such as torque is not output.

The K0 clutch 9 can connect the crank shaft 20 of the engine 7 to the rotor shaft 21 of the motor generator 10 through the damper mechanism 8. The K0 clutch 9 can switch the engagement state where the crank shaft 20 and the rotor shaft 21 engage with each other so as to transmit the power therebetween, the release state where the engagement therebetween is released, and the slip state between the engagement state and the release state. When the K0 clutch 9 becomes the engagement state, the crank shaft 20 and the rotor shaft 21 are connected to each other through the damper mechanism 8 so as to be rotatable, and hence power can be transmitted between the engine 7 and the motor generator 10. Meanwhile, when the K0 clutch 9 becomes the release state, the crank shaft 20 is separated from the rotor shaft 21, and hence the transmission of the power between the engine 7 and the motor generator 10 is interrupted.

As the K0 clutch 9, various clutches cart be used. For example, a friction type disk clutch device such as a multi-plate wet clutch or a dry single disk clutch can be used. Here, the K0 clutch 9 is, for example, a hydraulic device that is operated in response to the clutch hydraulic pressure as the hydraulic pressure of the working fluid supplied to the K0 clutch 9. The K0 clutch 9 becomes the release state were the engagement is completely released when the engagement force (the pressing force that engages the clutch plates) in response to the clutch hydraulic pressure is 0, and becomes the engagement state where the engagement is completely performed through the slip state (the half-engagement state) with an increase in engagement force. The transmission torque in the K0 clutch 9 is 0 in the release state, becomes a value in response to the engagement force in the slip state, and becomes a maximum value in the engagement state. Furthermore, the C1 clutch 18 and a lock-up clutch 25 to be described below are substantially the same as the K0 clutch 9.

The motor generator 10 is, for example, an alternating current synchronous motor or the like. The motor generator 10 is coupled to the rotor shaft 21 so as to be rotatable together while a stator 22 as a fixed member is fixed to a casing or the like and a rotor 23 as a rotation member is disposed at the inside of the stator 22 in the radial direction. The motor generator 10 is an electric rotating machine that includes a function (a powering function) as a motor converting the electrical power supplied from a battery 24 as an electrical storage device through an inverter or the like to the mechanical power and a function (a regeneration function) as a generator converting the input mechanical power into the electrical power and charging the electrical power in the battery 24 through an inverter or the like. For example, the motor generator 10 is driven by the alternating current power supplied from the battery 24 through the inverter, generates mechanical power (motor torque) in the rotor shaft 21, and outputs the mechanical, power from the rotor shaft 21.

The torque converter 11 is a kind of fluid coupling, and is connected to the rotor shaft 21 of the motor generator 10. The torque converter 11 includes the lock-up mechanism 16 that transmits the power from the engine 7 or the motor generator 10 through the lock-up clutch 25 and the fluid transmission mechanism 17 that transmits the power through working oil (working fluid). The lock-up mechanism 16 can connect the rotor shaft 21 to the output shaft (the output shaft of the fluid transmission device) 26 of the torque converter 11 through the lock-up clutch 25. The fluid transmission mechanism 17 includes a pump (a pump impeller) 17p, a turbine (a turbine runner) 17t, a stator 17s, a one-way clutch 17c, and the like, and the working oil, as the working fluid is charged therein. The pump 17p is connected to the rotor shaft 21 so as to be rotatable, and the turbine 17t is connected to the output shaft 26 so as to be rotatable.

Here, the lock-up clutch 25 can connect the rotor shaft 21 to the output shaft 26 through the turbine 17t. The lock-up clutch 25 can switch the engagement state where the rotor shaft 21 and the turbine 17t engage with each other so as to transmit the power therebetween, the release state where the engagement therebetween is released, and the slip state between the engagement state and the release state. When the lock-up clutch 25 becomes the engagement state, the rotor shaft 21 and the output shaft 26 are connected to each other through the turbine 17t so as to be rotatable together, and hence the power can be directly transmitted between the rotor shaft 21 and the output shaft 26 without using the working oil. Meanwhile, when the lock-up clutch 25 becomes the release state, the rotor shaft 21 is separated from the output shaft 26, and hence the transmission of the power between the rotor shaft 21 and the output shaft 26 is interrupted.

Accordingly, when the lock-up clutch 25 becomes the engagement state, the torque converter 11 transmits the power from the engine 7 or the motor generator 10 to the output shaft 26 through the lock-up clutch 25 and the turbine 17t as the torque which is substantially the same as the power, and hence the torque can be output from the output shaft 26. Meanwhile, when the lock-up clutch 25 becomes the non-engagement state, that is, the release state or the slip state, the torque converter 11 transmits the power from the engine 7 or the motor generator 10 to the output shaft 26 through the pump 17p, the working fluid, and the turbine 17t, and hence the power can be output from the output shaft 26. At this time, when the power is transmitted in the fluid transmission mechanism 17 through the working oil, the torque converter 11 amplifies the torque at a predetermined torque ratio, and transmits the resultant to the output shaft 26.

As described above, the transmission 12 includes the C1 clutch 18 and the transmission body 19, and outputs the power from the torque converter 11 to the driving wheel 3 by changing the speed thereof.

The C1 clutch 18 can connect the output shaft 26 of the torque converter 11 to the driving wheel 3 through the transmission body 19, the propeller shaft 13, the differential gear 14, the drive shaft 15, and the like. Here, the C1 clutch 18 can switch the engagement state where the output shaft 26 of the torque converter 11 and an input shaft 27 of the transmission body 19 engage with each other so as to transmit the power therebetween, the release state where the engagement therebetween is released, and the slip state between the engagement state and the release state. When the C1 clutch 18 becomes the engagement state, the output shaft 26 and the input shaft 27 are connected to each other so as to be rotatable together, and hence the power can be transmitted between the output shaft 26 and the input shaft 27. Meanwhile, when the C1 clutch 18 becomes the release state, the output shaft 26 is separated from the input shaft 27, and hence the transmission of the power between the output shaft 26 and the input shaft 27 is interrupted.

The transmission body 19 is, for example, a so-called automatic transmission such as a stepped automatic transmission (AT), a continuously variable automatic transmission (CVT), a multi-mode manual transmission (MMT), a sequential manual transmission (SMT), and a dual clutch transmission (DCT). Here, the transmission body 19 is configured as, for example, a stepped automatic transmission that includes a plurality of gear shift steps (gear steps) each having a predetermined gear shift ratio. The transmission body 19 changes the speed of the power input from the output shaft 26 of the torque converter 11 to the input shaft 27 through the C1 clutch 18 into a predetermined gear shift step is predetermined gear shift ratio), transmits the power to the output shaft (the output shaft of the transmission), and outputs the power to the propeller shaft 13 coupled to the output shaft so as to be rotatable together.

The differential gear 14 transmits the power from the propeller shaft 13 to the driving wheels 3 through the drive shafts 15. The differential gear 14 absorbs a difference in rotation speed between the inner driving wheel 3 at the center side when the vehicle 2 makes a turn and the outer driving wheel 3.

The driving device 4 with the above-described configuration can transmit the power generated by the engine 7 from the crank shaft 20 to the driving wheel 3 through the damper mechanism 8, the K0 clutch 9, the rotor shaft 21, the torque converter 11, the transmission 12, the propeller shaft 13, the differential gear 14, and the drive shaft 15. Further, the driving device 4 can transmit the power generated by the motor generator 10 from the rotor shaft 21 to the driving wheel 3 through the torque converter 11, the transmission 12, the propeller shaft 13, the differential gear 14, and the drive shaft 15 without using the K0 clutch 9. As a result, the vehicle 2 can generate a driving force [N] in the ground contact surface between the driving wheel 3 and the road surface, and can run by using the driving force.

The state detecting device 5 is used to detect the state of the vehicle 2, and hence detects various physical states representing the state of the vehicle 2 and the operation states of the switches. The state detecting device 5 is electrically connected to the ECU 6, and can deliver information such as a detection signal, a drive signal, or a control instruction therebetween. The state detecting device 5 includes, for example, an accelerator opening degree sensor 50, a brake sensor 51, a vehicle speed sensor 52, a crank angle sensor 53, a motor rotation number sensor 54, a turbine rotation number sensor 55, a G-sensor 56, a charge state detector 57, a towing detector 52, an OD lock switch 59, and the like. The accelerator opening degree sensor 50 detects the accelerator opening degree corresponding to the operation amount (the accelerator operation amount and the acceleration request operation amount) of the accelerator pedal of the vehicle 2 performed by the driver. The brake sensor 51 detects a brake stepping force or a master cylinder pressure corresponding to the operation amount (the brake operation amount and the brake request operation amount) of the brake pedal of the vehicle 2 performed by the driver. The vehicle speed sensor 52 detects the vehicle speed as the running speed of the vehicle 2. The crank angle sensor 53 detects the crank angle as the rotation angle of the crank shaft 20. The ECU 6 can determine the intake cycle, the compression cycle, the expansion cycle, and the exhaust cycle of each cylinder of the engine 7 based on the crank angle and can calculate the engine rotation number as the rotation number (the rotation speed) of the crank shaft 20. The motor rotation number sensor 54 detects the motor rotation number as the rotation number of the rotor shaft 21 of the motor generator 10. The turbine rotation number sensor 55 detects the turbine rotation number which is the rotation number of the turbine 17t of the torque converter 11 and corresponds to the output rotation number from the torque converter 11. The G-sensor 56 detects the acceleration acting on the vehicle body of the vehicle 2. The charge state detector 57 detects a charging state SOC in response to the battery voltage or the electrical storage amount the charging amount) of the battery 24. The towing detector 58 detects a state where the vehicle 2 tows the other vehicle. The towing detector 58 can be configured as a towing mode switch or the like. The OD lock switch 59 detects a state where the OD lock state of the vehicle 2 is selected.

The OD lock state is a state where the rotation number ratio between the crank shaft 20 and the output shaft (the propeller shaft 13) of the transmission 12 is fixed to an overdrive state where the crank shaft 20 rotates at a speed lower than that of the output shaft of the transmission 12.

The ECU 6 is a control unit that generally controls the entire vehicle control system 1 and controls the engine 7 or the motor generator 10 in a corporation state. The ECU 6 is an electronic circuit that is configured as a well-known microcomputer including a CPU, a ROM, a RAM, and an interface. The ECU 6 is electrically connected to the state detecting device 5, and is electrically connected to the fuel injection device, the ignition device, and the throttle device of the engine 7, the inverter of the motor generator 10, the battery 24, and the like. Further, the ECU 6 is connected to the K0 clutch 9, the lock-up clutch 25, the C1 clutch 18, the transmission body 19, and the like through a hydraulic pressure controller 28, and controls the operations thereof through the hydraulic pressure controller 28. The ECU 6 receives the electrical signal corresponding to the detection result obtained by the state detecting device 5, and outputs the drive signals to the respective components of the driving device 4 such as the engine 7, the inverter of the motor generator 10, and the hydraulic pressure controller 28 in response to the input detection result so as to control the drive states thereof.

Here, the hydraulic pressure controller 28 controls the speed changing operation of the transmission body 19 or the engagement operation, the release operation, and the slip operation of the engagement components such as the K0 clutch 9, the lock-up clutch 25, and the C1 clutch 18 by the hydraulic pressure of the working oil (the oil) as the working fluid. The hydraulic pressure controller 28 includes various known hydraulic control circuits controlled by the ECU 6. For example, the hydraulic pressure controller 28 includes a plurality of oil channels, an oil reservoir, an oil pump, a plurality of electromagnetic valves, and the like. The hydraulic pressure controller 28 controls the flow amount or the hydraulic pressure of the working fluid supplied to the respective components of the driving device 4 in response to the signal from the ECU 6.

For example, the ECU 6 controls the throttle device of the engine 7 based on the accelerator opening degree, the vehicle speed, and the like, adjusts the throttle opening degree of the intake passageway, adjusts the intake air amount, controls the fuel injection amount in response to the change, and adjusts the amount of the air-fuel mixture charged in the combustion chamber, thereby controlling the output of the engine 7. Further, the ECU 6 controls the hydraulic pressure controller 28, for example, based on the accelerator opening degree, the vehicle speed, and the like and controls the speed changing operation of the transmission body 19 or the engagement operations, the release operations, and the slip operations of the K0 clutch 9, the lock-up clutch 25, the C1 clutch 18, and the like.

The vehicle control system 1 with the above-described configuration can cause the vehicle 2 to run in various running modes in a manner such that the ECU 6 controls the driving device 4 so as to selectively use one or both the engine 7 and the motor generator 10.

For example, the ECU 6 sets the K0 clutch 9 to the engagement state (the ON state of the K0 clutch) and operates the engine 7 so that only the power (the engine torque) output from the engine 7 among the engine 7 and the motor generator 10 as the running driving sources is transmitted to the driving wheel 3. At this time, the C1 clutch 18 becomes an engagement state (an ON state of the C1 clutch). Accordingly, the vehicle control system 1 can realize the "engine running" mode. Accordingly, the vehicle 2 can run by using only the engine 7 among the running driving sources.

Further, the ECU 6 performs the powering operation of the motor generator 10 in response to the charging state SOC of the battery 24 or the request driving force while the K0 clutch 9 becomes the engagement state (the ON state of the K0 clutch) and the engine 7 is operated, combines the power output from the engine 7 and the power (the motor torque) output from the motor generator 10, and transmits the resultant to the driving wheel 3. At this time, the C1 clutch 18 becomes an engagement state (an ON state of the C1 clutch). Accordingly, the vehicle control system 1 can realize an "HV running" mode. Accordingly, the vehicle 2 can run by using both the engine 7 and the motor generator 10.

Further, the ECU 6 sets, for example, the K0 clutch 9 to the release state (the OFF state of the K0 clutch), stops the engine 7 so as to become the non-operation state, performs the powering operation of the motor generator 10, and transmits only the power output from the motor generator 10 among the engine 7 and the motor generator 10 as the running driving sources to the driving wheel 3. At this time, the C1 clutch 18 becomes an engagement state (an ON state of the C1 clutch). Further, since the engine 7 becomes the non-operation state and the K0 clutch 9 becomes the release state, the rotation of the crank shaft 20 is also stopped. Accordingly, the vehicle control system 1 can realize the "EV running" mode. Accordingly, the vehicle 2 can run by using only the motor generator 10 among the running driving sources. At this time, the vehicle 2 does not receive the rotation resistance of the engine 7 due to the state where the crank shaft 20 and the rotor shaft 21 are mechanically separated from each other at the K0 clutch 9.

Further, the ECU 6 controls, for example, the motor generator 10 when the vehicle 2 runs in a deceleration state, and generates power by the regeneration of the motor generator 10 due to the power transmitted from the driving wheel 3 to the rotor shaft 21. Then, the ECU transmits the mechanical power (the negative motor torque) generated in the rotor shaft 21 to the driving wheel 3. At this time, the C1 clutch 18 becomes an engagement state (an ON state of the C1 clutch). Accordingly, the vehicle control system 1 can realize the "regeneration running" mode. Accordingly, the vehicle 2 can run in a deceleration state while performing the regeneration braking operation using the motor generator 10.

Further, the ECU 6 can perform the N-control as the slip control by controlling the engine 7, the K0 clutch 9, the motor generator 10, and the C1 clutch 18, for example, while the engine 7 becomes the non-operation state, the rotation of the crank shaft 20 is stopped, or the vehicle 2 is stopped. Here, the N-control that is performed by the ECU 6 indicates a control in which the motor generator 10 is driven while the K0 clutch 9 becomes the release state (the OFF state of the K0 clutch), the engine 7 becomes the non-operation state, and the C1 clutch 18 becomes the slip state. Accordingly, even when the engine 7 becomes the non-operation state and the rotation of the crank shaft 20 is stopped or the vehicle 2 is stopped, the vehicle control system 1 can drive, for example, an auxiliary unit such as a mechanical oil pump connected to the pump 17p or the rotor shaft 21 and hence can exert a torque corresponding to a so-called creep torque on the driving wheel 3. At this time, the vehicle control system 1 can relatively reduce the load of the motor generator 10 by causing the C1 clutch 18 to become the slip state as described above, and hence can suppress the electrical power consumption.

Then, the ECU 6 can start up the engine 7 by using the motor generator 10 as the starter motor of the engine 7, for example, in a case where the engine 7 is started up when the engine 7 becomes the non-operation state and the rotation of the crank shaft 20 is stopped. In this case, the ECU 6 performs the rotation (cranking) of the crank shaft 20 of the engine 7 by using a part of the power (the torque) output from the motor generator 10 while setting the K0 clutch 9 to the slip state. Then, the ECU 6 starts up the engine 7 by rotating the crank shaft 20 and igniting the fuel injected into the combustion chamber.

Further, the ECU 6 can start up the engine 7 as described below, for example, when the engine 7 is a so-called direct injection engine. That is, the ECU 6 ignites the fuel injected into the combustion chamber and starts the rotation of the crank shaft 20 of the engine 7 by the combustion of the fuel. Then, the ECU 6 sets the K0 clutch 9 to the slip state after the rotation of the crank shaft 20 is started by the combustion of the fuel and assists the rotation of the crank shaft 20 by using a part of the power output from the motor generator 10, and then starts up the engine 7.

Then, the ECU 6 or this embodiment can obtain the balance of the vehicle starting responsiveness and the fuel economy performance by appropriately changing the state of the engagement patterns of the K0 clutch 9 and the C1 clutch 18 in accordance with the situation in a case where the engine 7 is started up when the vehicle 2 starts to run.

Specifically, the ECU 6 performs first engagement control (hereinafter, referred to as the "first engagement control" unless any remark is mentioned) in a case where the lock-up clutch 25 is the non-engagement state when the engine 7 is started up and the vehicle 2 starts to run while the N-control is performed. The state where the lock-up clutch 25 is in the non-engagement state indicates a case where the lock-up clutch 25 is in the release state or the slip state and the power is transmitted in the torque converter 11 through the fluid transmission mechanism 17. In this case, the ECU 6 performs the first engagement control in which the C1 clutch 18 first becomes the engagement state and the K0 clutch 9 becomes the engagement state (the first engagement pattern).

Meanwhile, the ECU 6 performs second engagement control (hereinafter, referred to as the "second engagement control" unless any remark is mentioned) in a case where the lock-up clutch 25 is in the engagement state when the engine 7 is started up to start the vehicle 2 to run during the N-control. The case where the lock-up clutch 25 is in the engagement state indicates a case where the power is not transmitted in the torque converter 11 through the fluid transmission mechanism 17 and the entire power is transmitted through the lock-up mechanism 16. In this case, the ECU 6 performs the second engagement control in which the K0 clutch 9 first becomes the engagement state and the C1 clutch 18 becomes the engagement state (the second engagement pattern).

Here, the ECU 6 can start the vehicle 2 to run in the first starting pattern or the second starting pattern when the engine 7 is started up to start the vehicle 2 to run during the N-control. The first starting pattern is the starting pattern in which the lock-up clutch 25 becomes the non-engagement state during the N-control and the power is transmitted in the torque converter 11 through the fluid transmission mechanism 17 as described above. The ECU 6 performs the first engagement control in the first starting pattern. Meanwhile, the second starting pattern is the starting pattern in which the lock-up clutch 25 is in the engagement state during the N-control, the power is not transmitted in the torque converter 11 through the fluid transmission mechanism 17 as described above, and the entire power is transmitted through the lock-up mechanism 16. The ECU 6 performs the second engagement control in the second starting pattern.

The ECU 6 controls the lock-up clutch 25 in response to the state of the vehicle 2 so as to switch the engagement state and the non-engagement state and switch the first starting pattern and the second starting pattern. That is, the ECU 6 controls the lock-up clutch 25 in response to the state of the vehicle 2 so as to switch the engagement state and the non-engagement state and switch the first engagement control and the second engagement control.

For example, the ECU 6 sets the lock-up clutch 25 to the non-engagement state and performs the first engagement control in the first starting pattern in a case where the starting responsiveness in response to the state of the vehicle 2 is important. In this case, the ECU 6 sets the C1 clutch 18 to the slip state since the lock-up clutch 25 is in the non-engagement state and the N-control is performed. In this state, the ECU 6 controls the motor generator 10 while setting the K0 clutch 9 to the slip state so as to start up the engine 7 with the start of the vehicle 2, maintains the motor rotation number to the engine start-up rotation number, and starts up the engine 7. At this time, the ECU 6 first sets the C1 clutch 18 to the engagement state so that the C1 clutch promptly engages. Subsequently, the ECU sets the K0 clutch 9 to the engagement state in which the K0 clutch completely engages when the engine rotation number becomes an autonomous running rotation number, the engine 7 is completely started up, and the engine rotation number is substantially synchronized with the motor rotation number.

In this case, the vehicle control system 1 transmits the power through the fluid transmission mechanism 17 in the torque converter 11 when the lock-up clutch 25 is in the release state or the slip state. For this reason, the vehicle control system 1 can reduce the vibration in the torque converter 11 even when the C1 clutch 18 immediately becomes the engagement state when the engine 7 is started up. Accordingly, the vehicle control system 1 can suppress the shock in the vehicle 2 since the transmission of the vibration with respect to the drive shaft 15 or the like can be suppressed when the K0 clutch 9 becomes the engagement state. Then, in this case, the vehicle control system 1 can maximally increase the transmission torque of the C1 clutch 18 at an early timing compared to, for example, the case of the second engagement control in that the C1 clutch 18 immediately becomes the engagement state during the start-up of the engine 7. As a result, the vehicle control system 1 can perform the initial rise (increase) in the driving force of the vehicle 2 at the comparatively early timing. Accordingly, the vehicle control system 1 can improve the responsiveness of the vehicle 2 in the starting operation (the accelerator ON operation) performed by the driver. That is, the vehicle control system 1 can suppress the shock and then improve the responsiveness when starting the vehicle 2 to run.

Meanwhile, for example, the ECU 6 performs the second engagement control in the second starting pattern while the lock-up clutch 25 becomes the engagement state when the fuel economy performance is important during the starting operation in response to the state of the vehicle 2. In this case, the ECU 6 sets the C1 clutch 18 to the slip state since the lock-up clutch 25 is in the engagement state and the N-control is performed. In this state, the ECU 6 controls the motor generator 10 while setting the K0 clutch 9 to the slip state so as to start up the engine 7 with the start of the vehicle 2, maintains the motor rotation number to the engine start-up rotation number, and starts up the engine 7. At this time, the ECU 6 first sets the K0 clutch 9 to the engagement state where the K0 clutch completely engages typically when the engine rotation number becomes an autonomous running rotation number, the engine 7 is completely started up, and the engine rotation number is substantially synchronized with the motor rotation number before the C1 clutch 18 becomes the engagement state while the C1 clutch 18 is maintained in the slip state. Then, the ECU 6 sets the K0 clutch 9 to the engagement state and then sets the C1 clutch 18 to the engagement state where the C1 clutch completely engages.

In this case, the vehicle control system 1 keeps the C1 clutch 18 in the slip state although the lock-up clutch 25 is in the engagement state. For this reason, the vehicle control system 1 can reduce the vibration in the C1 clutch 18 which is maintained in the slip state even after the K0 clutch 9 becomes the engagement state when the K0 clutch 9 becomes the engagement state during the start-up of the engine 7. Accordingly, since the vehicle control system 1 can suppress the transmission of the vibration with respect to the drive shaft 15 or the like when the K0 clutch 9 becomes the engagement state, the vehicle control system can suppress the shock. Then, in this case, the vehicle control system 1 does not transmit the power through the fluid transmission mechanism 17 in the torque converter 11 since the lock-up clutch 25 is maintained in the engagement state. As a result, the vehicle control system 1 can suppress the energy loss caused by the slip in the fluid transmission mechanism 17. Accordingly, the vehicle control system 1 can improve the fuel economy performance when the vehicle 2 starts to run. That is, the vehicle control system 1 can suppress the shock and then improve the fuel economy performance when the vehicle 2 starts to run.

Furthermore, the ECU 6 may switch the first starting pattern and the second starting pattern in response to, for example, the vehicle towing state using the vehicle 2 other than the state of the vehicle 2. In this case, the ECU 6 switches the first starting pattern and the second starting pattern in response to the detection result obtained by the towing detector 58. The ECU 6 performs the first engagement control in the first starting pattern while the lock-up clutch 25 becomes the non-engagement state in a state where the vehicle 2 tows the other vehicle. Meanwhile, the ECU 6 performs the second engagement control in the second starting pattern while the lock-up clutch 25 becomes the engagement state in a state where the vehicle 2 does not tow the other vehicle. Accordingly, in a state where the vehicle 2 tows the other vehicle, the vehicle control system 1 amplifies the torque by the transmission of the power through the fluid transmission mechanism 17 in the torque converter 11 and transmits the driving force to the driving wheel 3 with satisfactory responsiveness. As a result, the vehicle control system 1 can start the vehicle 2 to run with satisfactory responsiveness even in the state where the vehicle 2 tows the other vehicle. Furthermore, the ECU 6 can detect the other vehicle towing state using the vehicle 2 in response to, for example, the relation between the driving force and the acceleration of the vehicle 2 other than the detection result of the towing detector 58.

Further, the ECU 6 may switch the first starting pattern and the second starting pattern in response to the state of the OD lock switch 59 as a selection portion in order to fix the state of the vehicle 2 to, for example, the overdrive state of the vehicle 2. In this case, the ECU 6 switches the first starting pattern and the second starting pattern in response to the detection result using the OD lock switch 59. The ECU 6 performs the first engagement control in the first starting pattern while the lock-up clutch 25 becomes the non-engagement state in a case where the OD lock state is selected (the ON state of the OD lock switch). Meanwhile, the ECU 6 performs the second engagement control in the second starting pattern while the lock-up clutch 25 becomes the engagement state in a case where the OD lock state is not selected (the OFF state of the OP lock switch). Accordingly, in the OD lock state, the vehicle control system 1 amplifies the torque by the transmission of the power through the fluid transmission mechanism 17 in the torque converter 11 and transmits the driving force to the driving wheel 3 with satisfactory responsiveness. As a result, the vehicle control system 1 can start the vehicle 2 to run with satisfactory responsiveness even when a comparatively large torque is needed in the OD lock state.

Further, the ECU 6 may switch the first starting pattern and the second starting pattern in response to, for example, the state of the road surface where the vehicle 2 runs as the state of the vehicle 2. In this case, the ECU 6 determines whether the road surface where the vehicle 2 runs is a rough road in response to, for example, the detection result of the G-sensor 56 and switches the first starting pattern and the second starting pattern based on the determination result. The ECU 6 performs the first engagement control in the first starting pattern while the lock-up clutch 25 becomes the non-engagement state in a case where the vehicle 2 runs on the rough road. Meanwhile, the ECU 6 performs the second engagement control in the second starting pattern while the lock-up clutch 25 becomes the engagement state in a case where the vehicle 2 runs on the road surface other than the rough road. Accordingly, in a case where the vehicle 2 runs on the rough road, the vehicle control system 1 amplifies the torque by the transmission of the power through the fluid transmission mechanism 17 in the torque converter 11 and transmits the driving force to the driving wheel 3 with satisfactory responsiveness. In this case, the vehicle control system 1 can reduce the vibration generated in the drive system due to the transmission of the power through the fluid transmission mechanism 17 when the vehicle 2 runs on the rough road which tends to generate a shock. Accordingly, the vehicle control system 1 can appropriately suppress the shock and then start the vehicle 2 to run with satisfactory responsiveness.

Further, the ECU 6 may switch the first starting pattern and the second starting pattern in response to, for example, the inclination of the road surface where the vehicle 2 runs as the state of the vehicle 2. In this case, the ECU 6 determines the inclination of the road surface where the vehicle 2 runs in response to, for example, the detection result of the G-sensor 56 and switches the first starting pattern and the second starting pattern based on the determination result. The ECU 6 performs the first engagement control in the first starting pattern while the lock-up clutch 25 becomes the non-engagement state when the inclination of the road surface where the vehicle 2 runs is the upward inclination. Meanwhile, the ECU 6 performs the second engagement control in the second starting pattern while the lock-up clutch 25 becomes the engagement state in a case where the inclination of the road surface where the vehicle 2 runs is not the upward inclination, that is, the inclination is the flat road or the downward inclination. Accordingly, in a case where the vehicle 2 runs on the road surface of the upward inclination, the vehicle control system 1 amplifies the torque by the transmission of the power through the fluid transmission mechanism 17 in the torque converter 11 and transmits the driving force to the driving wheel 3 with satisfactory responsiveness. As a result, the vehicle control system 1 can start the vehicle 2 to run with satisfactory responsiveness even when the vehicle 2 runs on the road surface of the upward inclination and a comparatively large torque is needed.

Further, the ECU 6 may switch the first starting pattern and the second starting pattern in response to, for example, the acceleration request operation amount with respect to the vehicle 2 performed by the driver as the state of the vehicle 2. In this case, the ECU 6 switches the first starting pattern and the second starting pattern based on, for example, the detection result of the accelerator opening degree sensor 50. The ECU 6 performs the first engagement control in the first starting pattern while the lock-up clutch 25 becomes the non-engagement state in a case where the accelerator opening degree corresponding to the acceleration request operation amount is relatively large or the accelerator opening degree change amount per unit time is large, that is, the accelerator pedal stepping amount is relatively large or the accelerator pedal stepping operation is relatively fast. Meanwhile, the ECU 6 performs the second engagement control in the second starting pattern while the lock-up clutch 25 becomes the engagement state in a case where the accelerator opening degree is relatively small or the accelerator opening degree change amount per unit time is small, that is, the accelerator pedal stepping amount is relatively small or the accelerator pedal stepping operation is relatively slow. Accordingly, in a case where the accelerator pedal stepping amount is relatively large or the accelerator pedal stepping operation is relatively fast, the vehicle control system 1 amplifies the torque by the transmission of the power through the fluid transmission mechanism 17 in the torque converter 11 and transmits the driving force to the driving wheel 3 with satisfactory responsiveness. As a result, the vehicle control system 1 can start the vehicle 2 to run with satisfactory responsiveness in a case where a comparatively large torque is needed in response to the acceleration request operation with respect to the vehicle 2 performed by the driver.

Further, the ECU 6 may switch the first starting pattern and the second starting pattern in response to, for example, the charging state SOC of the battery 24 as the state of the vehicle 2. In this case, the ECU 6 switches the first starting pattern and the second starting pattern based on, for example, the detection result of the charge state detector 57. The ECU 6 performs the first engagement control in the first starting pattern while the lock-up clutch 25 becomes the non-engagement state in a case where the charging state (the electrical storage amount) SOC is equal to or smaller than a predetermined maximal allowing electrical storage amount. Meanwhile, the ECU 6 performs the second engagement control in the second starting pattern while the lock-up clutch 25 becomes the engagement state in a case where the charging state (the electrical storage amount) SOC is larger than the maximal allowing electrical storage amount. Accordingly, the vehicle control system 1 can suppress the shock even when the engine torque is large immediately after the engine is started in a case where the charging state (the electrical storage amount) SOC is larger than the maximal allowing electrical storage amount and the charging amount with respect to the motor generator 10 needs to be limited. That is, in this case, in the vehicle control system 1, the torque is not amplified in the torque converter 11 even when the motor generator 10 may not regenerate the large engine torque generated after the K0 clutch 9 becomes the engagement state, and the transmission torque is limited in the C1 clutch 18 which is in the slip state. As a result, the vehicle control system 1 can suppress a large torque from abruptly acting on the driving wheel 3 and then start the vehicle 2 to run after the shock on the vehicle 2 is suppressed.

Furthermore, the ECU 6 can also perform the normal engagement control other than the first engagement control and the second engagement control in the engagement control of the K0 clutch 9 and the C1 clutch 18. The normal engagement control is a control which is performed typically in a case where the engine 7 is started up while the vehicle 2 runs in a case where the engine 7 is started up in a state where the N-control is not performed. In this case, the ECU 6 performs the normal engagement control the normal engagement pattern) as described below. That is, the ECU 6 first sets the lock-up clutch 25 to the non-engagement state, maintains the motor rotation number controlling the motor generator 10 at the engine start-up rotation number while the K0 clutch 9 becomes the slip state so as to start up the engine 7, and then starts up the engine 7. Subsequently, the ECU 6 sets the K0 clutch 9 to the engagement state and then sets the lock-up clutch 25 to the engagement state.

Next, an example of the control using the ECU 6 in the vehicle control system 1 will be described by referring to the flowchart of FIG. 2. Furthermore, the control routine is repeated at the control period of several milliseconds to several tens of milliseconds.

First, the ECU 6 determines whether the start-up request of the engine 7 is generated in response to the detection result of the state detecting device 5 (ST1). The ECU 6 determines whether the start-up request of the engine 7 is generated based on, for example, the charging state SOC and the accelerator opening degree corresponding to the acceleration request operation amount. When it is determined that the start-up request of the engine 7 is not generated (ST1: No), the ECU 6 ends the current control period and moves to the next control period.

When it is determined that the start-up request of the engine 7 is generated (ST1: Yes), the ECU 6 determines whether the engagement of the C1 clutch 18 is completed based on the operation state of the hydraulic pressure controller 28 or the C1 clutch 18 (ST2).

When it is determined that the engagement of the C1 clutch 18 is completed (ST2: Yes), that is, the N-control is not performed while the vehicle 2 runs, the ECU 6 performs the normal engagement control (the normal engagement pattern) (ST3), ends the current control period, and moves to the next control period.

When it is determined that the engagement of the C1 clutch 18 is not completed (ST2: No), that is, the N-control is performed while the vehicle 2 is stopped, the ECU 6 determines whether the lock-up clutch 25 becomes the non-engagement state in response to the detection result of the state detecting device 5 (ST4). The ECU 6 determines whether the lock-up clutch 25 becomes the non-engagement state in response to the above-described state of the vehicle 2.

When it is determined that the lock-up clutch (L/U) 25 becomes the non-engagement state in response to the state of the vehicle 2 (ST4: Yes), the ECU 6 sets the lock-up clutch 25 to the non-engagement state (ST5), performs the first engagement control (the first engagement pattern) in the first starting pattern (ST6), ends the current control period, and moves to the next control period.

When it is determined that the lock-up clutch (L/U) 25 becomes the engagement state in response to the state of the vehicle 2 (ST4: No), the ECU 6 sets the lock-up clutch 25 to the engagement state (ST7), performs the second engagement control (the second engagement pattern) in the second starting pattern (ST8), ends the current control period, and moves to the next control period.

Next, an example of the operation of the vehicle control system 1 with the above-described configuration will be described by referring to the time charts of FIGS. 3 and 4. In FIGS. 3 and 4, the horizontal axis indicates the time axis, the vertical axis indicates the rotation number, the pedal stepping amount, the clutch hydraulic pressure (K0 hydraulic pressure) of the K0 clutch 9, the clutch hydraulic pressure (C1 hydraulic pressure) of the C1 clutch 18, and the clutch hydraulic pressure (L/U hydraulic pressure) of the lock-up clutch. In FIGS. 3 and 4, the solid line L1 indicates the engine rotation number, the solid line L2 indicates the motor rotation number, the solid line L3 indicates the turbine rotation number, the solid line L4 indicates the rotation number obtained by multiplying the rotation number (the output rotation number of the transmission) of the propeller shaft 13 by the gear shift ratio (the gear ratio) of the transmission 12 or the like, and the dotted line L5 indicates the motor rotation number and the turbine rotation number when the vehicle starts to run without starting up the engine 7. Further, in FIGS. 3 and 4, the solid line L6 indicates the brake pedal stepping amount, and the solid line L7 indicates the accelerator pedal stepping amount. Further, in FIGS. 3 and 4, the solid line L8 indicates the C1 hydraulic pressure, the solid line L9 indicates the K0 hydraulic pressure, the dotted line L10 indicates the C1 hydraulic pressure when the vehicle starts to run without starting up the engine 7, and the solid line L11 indicates the L/U hydraulic pressure. Then, FIG. 3 illustrates a case where the first engagement control (the first engagement pattern) is performed in the first starting pattern, and FIG. 4 illustrates a case where the second engagement control (the second engagement pattern) is performed in the second starting pattern.

When the brake operation becomes an OFF state at the time t11 as illustrated in FIG. 3 when the first engagement control is performed in the first starting pattern, the ECU 6 controls the hydraulic pressure controller 28 so that the L/U hydraulic pressure (see the solid line L11) decreases and the lock-up clutch 25 becomes the slip state. Also, the ECU controls the hydraulic pressure controller 28 so that the C1 hydraulic pressure (see the solid line L8) of the C1 clutch 18 which is in the slip state during the N-control promptly increases and the C1 clutch 18 becomes the engagement state at the time t12. In the vehicle control system 1, the output shaft 26 and the input shaft 27 rotate together when the C1 clutch 18 becomes the engagement state, and hence the rotation number indicated by the solid line L4 matches the turbine rotation number (see the solid line L3). At this time, the ECU 6 controls the hydraulic pressure controller 28 so that the K0 hydraulic pressure (see the solid line L9) of the K0 clutch 9 is adjusted, the motor rotation number (see the solid line L2) controlling the motor generator 10 is maintained at the engine start-up rotation number while the K0 clutch 9 becomes the slip state, and then starts up the engine 7. Then, the ECU 6 controls the hydraulic pressure controller 28 at the time t13 in which the engine rotation number (see the solid line L1) becomes an autonomous running rotation number, the engine 7 is completely started up, and the engine rotation number and the motor rotation number are substantially synchronized with each other so that the K0 hydraulic pressure (see the solid line L9) increases and the K0 clutch 9 becomes the engagement state. In the vehicle control system 1, when the K0 clutch 9 engages, the crank shaft 20 and the rotor shaft 21 rotate together and the motor rotation speed (see the solid line L2) matches the engine rotation speed (see the solid line L1). Subsequently, the ECU 6 controls the hydraulic pressure controller 28 at the time t14 after the vehicle 2 starts to run so that the L/U hydraulic pressure (see the solid line L11) increases and the lock-up clutch 25 becomes the engagement state. In this case, the vehicle control system 1 can reduce the shock in the torque converter 11 after performing the initial, rise (increase)

of the driving force of the vehicle 2 by immediately causing the C1 clutch 18 to become the engagement state during the start-up of the engine 7.

Meanwhile, in a case where the second engagement control is performed in the second starting pattern, the ECU 6 maintains the L/U hydraulic pressure (see the solid line L11) and maintains the lock-up clutch 25 in the engagement state even when the brake becomes an OFF state at the time t21 as illustrated in FIG. 4. Also, the ECU also maintains the C1 hydraulic pressure (see the solid line L8) of the C1 clutch 18 which is in the slip state during the N-control in a low pressure and maintains the C1 clutch 18 in the slip state. Accordingly, the ECU 6 relatively extends the time until the C1 clutch 18 engages. In this case, in the vehicle control system 1, the motor rotation number (see the solid line L2) matches the turbine rotation number (see the solid line L3) since the lock-up clutch 25 becomes the engagement state and the rotor shaft 21 and the turbine 17t rotate together. At this time, the ECU 6 controls the hydraulic pressure controller 28 so that the K0 hydraulic pressure (see the solid line L9) of the K0 clutch 9 is adjusted, maintains the motor rotation number (see the solid line L2) controlling the motor generator 10 at the engine start-up rotation number while the K0 clutch 9 becomes the slip state, and then starts up the engine 7. Then, the ECU 6 controls the hydraulic pressure controller 28 at the time t22 in which the engine rotation number (see the solid line L1) becomes the autonomous running rotation number, the engine 7 is completely started up, and the engine rotation number is substantially synchronized with the motor rotation number so that the K0 hydraulic pressure (see the solid line L9) increases and the K0 clutch 9 becomes the engagement state. In the vehicle control system 1, when the K0 clutch 9 engages, the crank shaft 20 and the rotor shaft 21 rotate together and the motor rotation speed (see the solid line L2) matches the engine rotation speed (see the solid line L1). Subsequently, the ECU 6 controls the hydraulic pressure controller 28 at the time t23 so that the C1 hydraulic pressure (see the solid line L8) increases and the C1 clutch 18 becomes the engagement state. In this case, since the vehicle control system 1 does not transmit the power through the fluid transmission mechanism 17 in the torque converter 11, the vehicle control system 1 can improve the fuel economy performance when the vehicle 2 starts to run and reduce the shock in the C1 clutch 18 which is in the slip state.

The vehicle control system 1 and the ECU 6 according to the above-described embodiment switches the engagement control of the K0 clutch 9 and the C1 clutch 18 to the first engagement control or the second engagement control in accordance with the situation in a case where the engine 7 is started up when the vehicle 2 starts to run. Accordingly, the vehicle control system 1 and the ECU 6 can suppress the shock generated during the start-up of the engine 7 and obtain the balance of the vehicle starting responsiveness and the fuel economy performance. As a result, the vehicle control system 1 and the ECU 6 can appropriately start the vehicle to run by starting up the engine 7.

Furthermore, the vehicle control system and the controller according to the above-described embodiment of the present invention are not limited the above-described embodiment, and can be modified into various forms within the scope of claims.

The above-described vehicle control system 1 may not include the damper mechanism 8 or the like.

The above-described vehicle control system 1 can have a configuration in which a starter is provided in the engine 7 and the rotation (cranking) of the crank shaft 20 of the engine 7 is performed by the starter so as to start up the engine 7. In this case, the ECU 6 sets the K0 clutch 9 to the release state during the start-up of the engine and switches the release state of the K0 clutch 9 to the engagement state in the first engagement control and the second engagement control.

REFERENCE SIGNS LIST

1 vehicle control system
2 vehicle
3 driving wheel
4 driving device
5 state detecting device
6 ECU (controller)
7 engine (internal combustion engine)
9 k0 clutch (first clutch)
10 motor generator (electric rotating machine)
11 torque converter (fluid transmission device)
12 transmission
18 c1 clutch (second clutch)
24 battery (electrical storage device)

The invention claimed is:

1. A vehicle control system comprising:
an internal combustion engine and an electric rotating machine configured to be running driving sources of a vehicle;
a first clutch configured to be able to connect the internal combustion engine and the electric rotating machine;
a fluid transmission device connected to the electric rotating machine configured to output power from the internal combustion engine or the electric rotating machine through a lock-up clutch at the time the lock-up clutch is in an engagement state, and output the power from the internal combustion engine or the electric rotating machine through a working fluid at the time the lock-up clutch is in a non-engagement state;
a transmission configured to include a second clutch capable of connecting the fluid transmission device to a driving wheel of the vehicle, and transmit the power from the fluid transmission device to output to the driving wheel side; and
a controller configured to control the internal combustion engine, the first clutch, the electric rotating machine, and the second clutch so that a slip control can be performed in a manner such that the internal combustion engine becomes a non-operation state by setting the first clutch to a release state and the electric rotating machine is driven by setting the second clutch to a slip state, wherein
in a case where the vehicle starts to run by starting up the internal combustion engine during the slip control is performed, the controller performs a first engagement control in which the second clutch becomes an engagement state and then the first clutch becomes an engagement state at the time the lock-up clutch is in a non-engagement state, and performs a second engagement control in which the first clutch becomes an engagement state and then the second clutch becomes an engagement state at the time the lock-up clutch is an engagement state.

2. The vehicle control system according to claim 1, wherein
the controller controls the lock-up clutch in response to the state of the vehicle so as to switch the engagement state and the non-engagement state and switch the first engagement control and the second engagement control.

3. The vehicle control system according to claim 1, wherein the controller performs the first engagement control by setting the lock-up clutch to the non-engagement state in a case where responsiveness is important at the time the vehicle starts to run, and performs the second engagement control by setting the lock-up clutch to the engagement state in a case where fuel economy performance is important at the time the vehicle starts to run.

4. The vehicle control system according to claim 2, wherein
the controller performs the first engagement control by setting the lock-up clutch to the non-engagement state in a case where responsiveness is important at the time the vehicle starts to run, and performs the second engagement control by setting the lock-up clutch to the engagement state in a case where fuel economy performance is important at the time the vehicle starts to run.

5. The vehicle control system according to claim 1, wherein
in response to a state where the vehicle tows the other vehicle, a state of a selection portion for fixing the vehicle in an overdrive state, a state of a road surface where the vehicle runs, an inclination of the road surface where the vehicle runs, an acceleration request operation amount with respect to the vehicle, or a charging state of an electrical storage device mounted on the vehicle, the controller controls the lock-up clutch so as to switch the engagement state and the non-engagement state and switch the first engagement control and the second engagement control.

6. The vehicle control system according to claim 2, wherein
in response to a state where the vehicle tows the other vehicle, a state of a selection portion for fixing the vehicle in an overdrive state, a state of a road surface where the vehicle runs, an inclination of the road surface where the vehicle runs, an acceleration request operation amount with respect to the vehicle, or a charging state of an electrical storage device mounted on the vehicle, the controller controls the lock-up clutch so as to switch the engagement state and the non-engagement state and switch the first engagement control and the second engagement control.

7. The vehicle control system according to claim 3, wherein
in response to a state where the vehicle tows the other vehicle, a state of a selection portion for fixing the vehicle in an overdrive state, a state of a road surface where the vehicle runs, an inclination of the road surface where the vehicle runs, an acceleration request operation amount with respect to the vehicle, or a charging state of an electrical storage device mounted on the vehicle, the controller controls the lock-up clutch so as to switch the engagement state and the non-engagement state and switch the first engagement control and the second engagement control.

8. A controller that controls a driving device disposed in a power transmission path with respect to a driving wheel of a vehicle in order of an internal combustion engine as a running driving source, a first clutch, an electric rotating machine as a running driving source, a fluid transmission device including a lock-up clutch, and a second clutch, the controller comprising:
a processor configured to perform a slip control in a manner such that the internal combustion engine becomes a non-operation state by setting the first clutch to a release state and the electric rotating machine is driven by setting the second clutch to a slip state, and
configured to perform a first engagement control in which the second clutch becomes an engagement state and then the first clutch becomes an engagement state at the time the lock-up clutch is in a non-engagement state, and to perform a second engagement control in which the first clutch becomes an engagement state and then the second clutch becomes an engagement state at the time the lock-up clutch is an engagement state at a time the vehicle starts to run by starting up the internal combustion engine during the slip control being performed.

\* \* \* \* \*